(12) United States Patent
Traynor et al.

(10) Patent No.: US 12,707,265 B2
(45) Date of Patent: Aug. 11, 2026

(54) SYSTEM, METHOD, AND APPARATUS FOR DETECTING CALL INTERCEPTION

(71) Applicant: UNIVERSITY OF FLORIDA RESEARCH FOUNDATION, INCORPORATED, Gainesville, FL (US)

(72) Inventors: Patrick G. Traynor, Gainesville, FL (US); Kevin Butler, Gainesville, FL (US); Christian Peeters, Gainesville, FL (US); Tyler Tucker, Gainesville, FL (US)

(73) Assignee: UNIVERSITY OF FLORIDA RESEARCH FOUNDATION, INCORPORATED, Gainesville, FL (US)

( * ) Notice: Subject to any disclaimer, the term of this patent is extended or adjusted under 35 U.S.C. 154(b) by 534 days.

(21) Appl. No.: 18/334,765

(22) Filed: Jun. 14, 2023

(65) Prior Publication Data

US 2024/0422545 A1 Dec. 19, 2024

(51) Int. Cl.

| | |
|---|---|
| ***H04W 12/00*** | (2021.01) |
| ***H04W 12/12*** | (2021.01) |
| *H04Q 1/45* | (2006.01) |

(52) U.S. Cl.
CPC .............. *H04W 12/12* (2013.01); *H04Q 1/45* (2013.01)

(58) Field of Classification Search
CPC .............................. H04W 12/00; H04W 12/12
See application file for complete search history.

(56) References Cited

U.S. PATENT DOCUMENTS

| | | | | |
|---|---|---|---|---|
| 6,560,320 | B1 * | 5/2003 | Paleiov | H04M 3/42 379/93.17 |
| 10,896,664 | B1 * | 1/2021 | Buesser | G10L 25/30 |
| 2019/0297503 | A1 * | 9/2019 | Traynor | H04L 9/3271 |

* cited by examiner

*Primary Examiner* — Michael T Vu
(74) *Attorney, Agent, or Firm* — ALSTON & BIRD LLP

(57) ABSTRACT

Methods described herein relate to identifying an audio rogue base station intercept of a call using a modified distance bounding algorithm. Methods may include: establishing a shared resource for a session with a remote end device; selecting a nonce and provide the nonce to the remote end device; generating a sequence of bits; dividing the sequence of bits into a predetermined number of subsequences; performing a bit exchange with the remote end device using dual tone multi-frequency (DTMF) tones; determining, from the bit exchange, an average time of transmission; and identifying the presence or absence of an adversary intercepting the session.

20 Claims, 5 Drawing Sheets

(a) Traditional call path (b) Call path through ARBS

| Number of Rounds | Number of Challenges (n) | Impersonation Fraud Success Rate | Mafia Fraud Success Rate | Execution Time (s) |
|---|---|---|---|---|
| 1 | 2 | 6.25% | 19.14% | 2.82 |
| 2 | 4 | 0.39% | 3.66% | 5.64 |
| 4 | 8 | 1.53E-03% | 0.13% | 11.28 |
| 8 | 16 | 2.33E-08% | 1.80E-04% | 22.56 |
| 16 | 32 | 5.42E-18% | 3.25E-10% | 45.12 |

FIG. 3

SYSTEM, METHOD, AND APPARATUS FOR DETECTING CALL INTERCEPTION

GOVERNMENT FUNDING

This invention was made with government support under 70RSAT20CB0000017 awarded by THE US DEPT OF HOMELAND SECURITY. The government has certain rights in the invention.

TECHNOLOGICAL FIELD

Example embodiments of the present invention relate generally to identifying call interception from an adversary, and more particularly, to identifying an audio rogue base station intercept of a call using a modified distance bounding algorithm

BACKGROUND

Mobile devices including cellular telephones that connect to a network through base stations of a network can be vulnerable to adversarial attacks that attempt to obtain information of value to an adversary. In cellular networks, international mobile subscriber identity catchers or "IMSI catchers" enable an adversary to surreptitiously intercept device identifiers of a user's mobile device. These interceptions enable an adversary to track location data of device users and to intercept data transmitted by a user device. These IMSI catchers allow adversaries to perform both presence testing and track user movement, potentially in real-time. These IMSI catchers pose a threat through exploiting weaknesses in older but still-deployed cellular standards, performing downgrade attacks from more secure standards, and even acquiring cryptographic keys directly from a network provider.

Detection of IMSI catchers has been a focus of technological development; however, there has been little development in the detection of more capable Audio Rogue Base Stations (ARBSs). While both classes of devices are capable of capturing user identifiers known as International Mobile Subscriber Identities (IMSIs), ARBSs are also capable of intercepting and eavesdropping on call audio. This ability to wiretap arbitrarily represents a threat to users of mobile devices.

BRIEF SUMMARY

Accordingly, a system, method, and apparatus are provided for identifying call interception from an adversary, and more particularly, to identifying an audio rogue base station intercept of a call using a modified distance bounding algorithm. Embodiments described herein may provide an apparatus including at least one processor and at least one non-transitory memory including computer program code instructions with the computer program code instructions configured to, when executed, cause the apparatus to at least: establish a shared resource for a session with a remote end device; select a nonce and provide the nonce to the remote end device; generate a sequence of bits; divide the sequence of bits into a predetermined number of sub-sequences; perform a bit exchange with the remote end device using dual tone multi-frequency (DTMF) tones; determine, from the bit exchange, an average time of transmission; and identify the presence or absence of an adversary intercepting the session.

According to some embodiments, causing the apparatus to perform a bit exchange with the remote end device using DTMF tones further includes causing the apparatus to determine a time of transmission for each bit exchange with the remote end device. The average time of transmission includes, in some embodiments, an average of the time of transmission for each bit exchange with the remote device. Causing the apparatus of some embodiments to identify the presence or absence of an adversary intercepting the session includes causing the apparatus to determine the presence of an adversary intercepting the session in response to the average time of transmission being above a first predetermined value.

Causing the apparatus of some embodiments to identify the presence or absence of an adversary intercepting the session includes causing the apparatus to determine the absence of an adversary intercepting the session in response to the average time of transmission being below a second predetermined value. According to certain embodiments, the sequence of bits is based, at least in part, on a number of challenges to the remote end device and a number of bits in each of the challenges to the remote end device. Causing the apparatus of some embodiments to establish the shared resource includes causing the apparatus to generate the shared resource using transport layer security (TLS).

Embodiments provided herein include a computer program product including at least one non-transitory computer-readable storage medium having computer-executable program code instructions stored therein, the computer-executable program code instructions including program code instructions to: establish a shared resource for a session with a remote end device; select a nonce and provide the nonce to the remote end device; generate a sequence of bits; divide the sequence of bits into a predetermined number of sub-sequences; perform a bit exchange with the remote end device using dual tone multi-frequency (DTMF) tones; determine, from the bit exchange, an average time of transmission; and identify the presence or absence of an adversary intercepting the session.

According to some embodiments, the program code instructions to perform a bit exchange with the remote end device using DTMF tones further include program code instructions to determine a time of transmission for each bit exchange with the remote end device. The average time of transmission includes, in some embodiments, an average of the time of transmission for each bit exchange with the remote device. The program code instructions of some embodiments to identify the presence or absence of an adversary intercepting the session include program code instructions to determine the presence of an adversary intercepting the session in response to the average time of transmission being above a first predetermined value.

The program code instructions of some embodiments to identify the presence or absence of an adversary intercepting the session include program code instructions to determine the absence of an adversary intercepting the session in response to the average time of transmission being below a second predetermined value. According to certain embodiments, the sequence of bits is based, at least in part, on a number of challenges to the remote end device and a number of bits in each of the challenges to the remote end device. The program code instructions of some embodiments to establish the shared resource include program code instructions to generate the shared resource using transport layer security (TLS).

Embodiments provided herein include a method including: establishing a shared resource for a session with a remote end device; selecting a nonce and provide the nonce to the remote end device; generating a sequence of bits; dividing the sequence of bits into a predetermined number of sub-sequences; performing a bit exchange with the remote end device using dual tone multi-frequency (DTMF) tones; determining, from the bit exchange, an average time of transmission; and identifying the presence or absence of an adversary intercepting the session.

According to some embodiments, performing a bit exchange with the remote end device using DTMF tones further includes determining a time of transmission for each bit exchange with the remote end device. The average time of transmission includes, in some embodiments, an average of the time of transmission for each bit exchange with the remote device. Identifying the presence or absence of an adversary intercepting the session includes, in some embodiments, determining the presence of an adversary intercepting the session in response to the average time of transmission being above a first predetermined value.

Identifying the presence or absence of an adversary intercepting the session includes, in some embodiments, determining the absence of an adversary intercepting the session in response to the average time of transmission being below a second predetermined value. According to certain embodiments, the sequence of bits is based, at least in part, on a number of challenges to the remote end device and a number of bits in each of the challenges to the remote end device. Establishing the shared resource includes, in certain embodiments, generating the shared resource using transport layer security (TLS).

The above summary is provided merely for purposes of summarizing some example embodiments to provide a basic understanding of some aspects of the invention. Accordingly, it will be appreciated that the above-described embodiments are merely examples and should not be construed to narrow the scope or spirit of the invention in any way. It will be appreciated that the scope of the invention encompasses many potential embodiments in addition to those here summarized, some of which will be further described below.

BRIEF DESCRIPTION OF THE DRAWINGS

Figure 1:
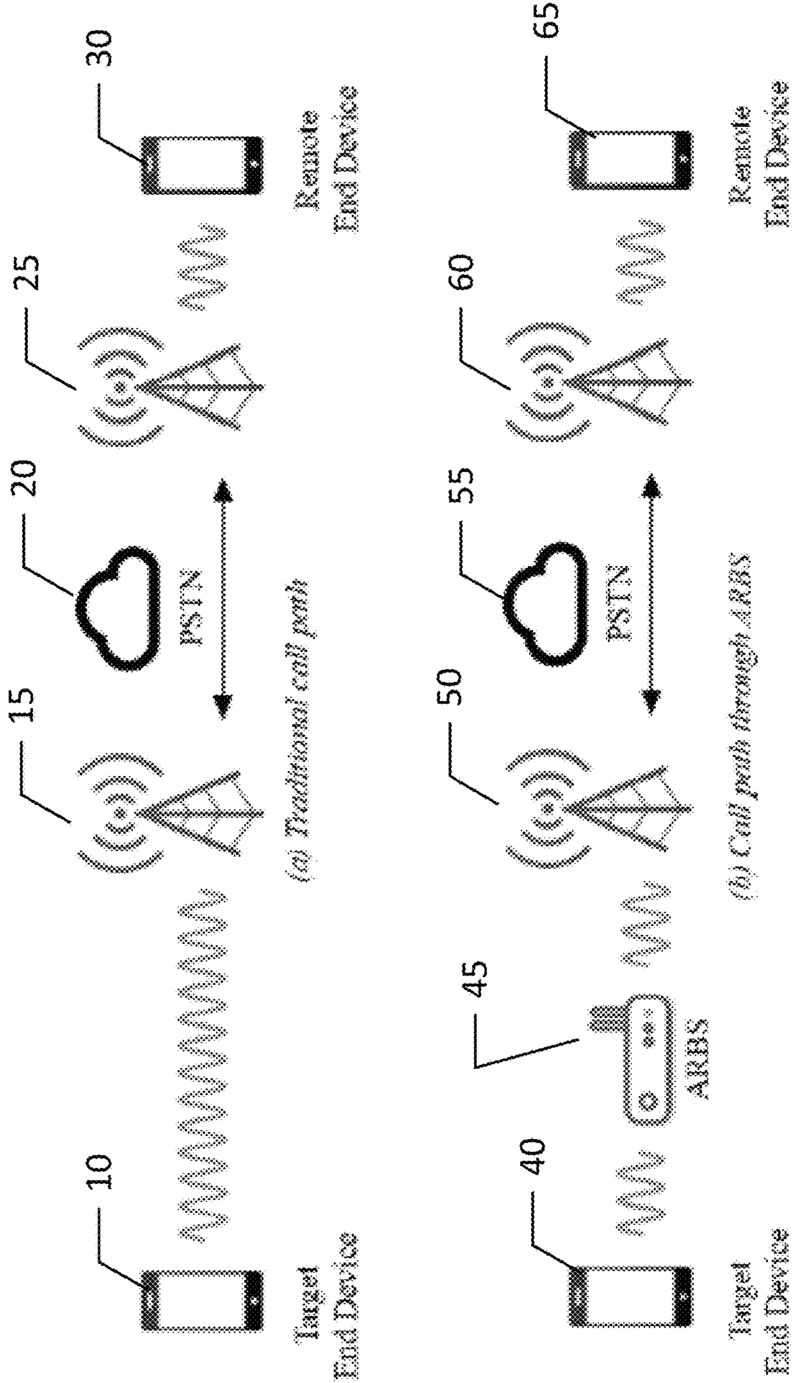
Figure 2:
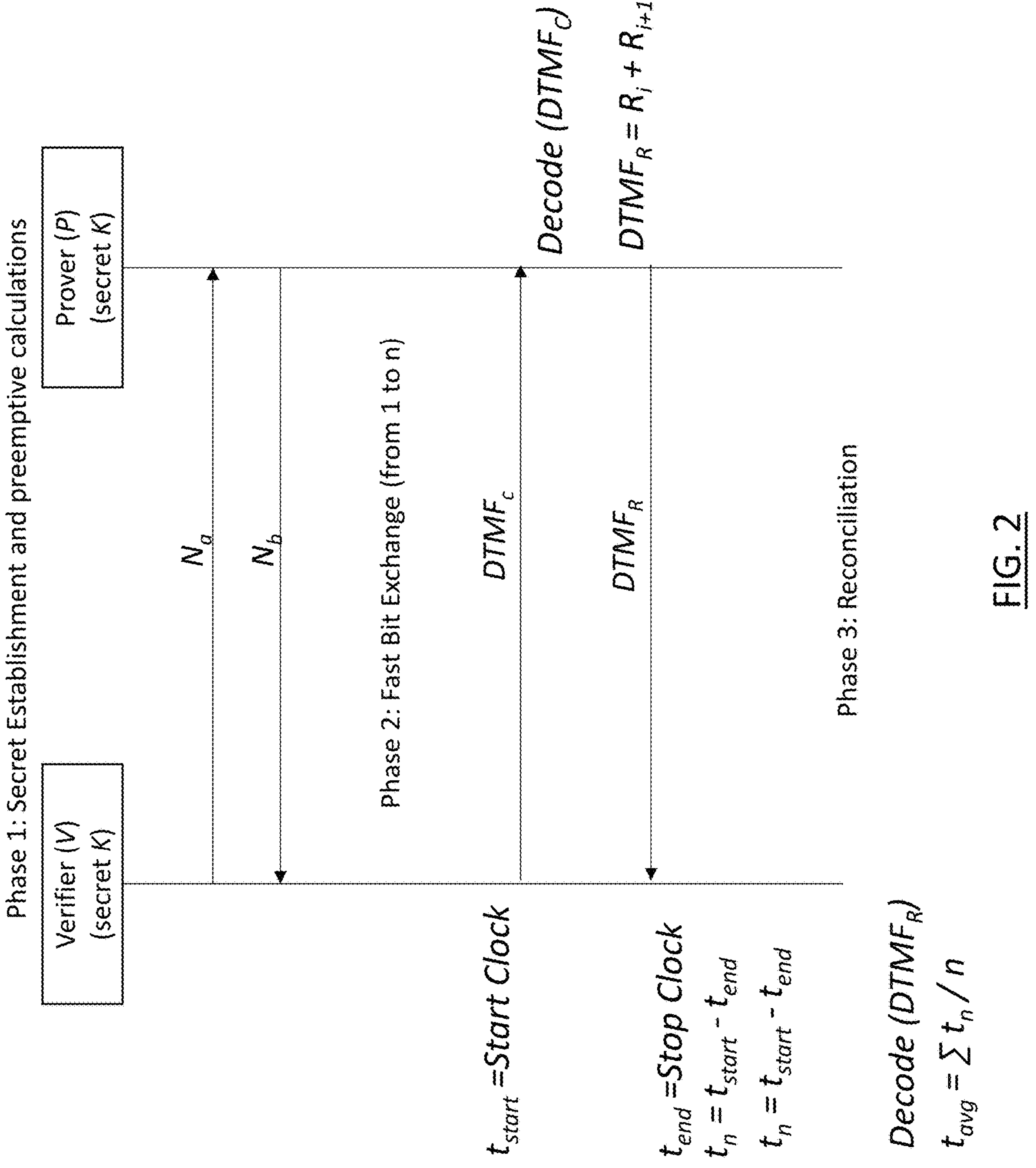
Figure 4:
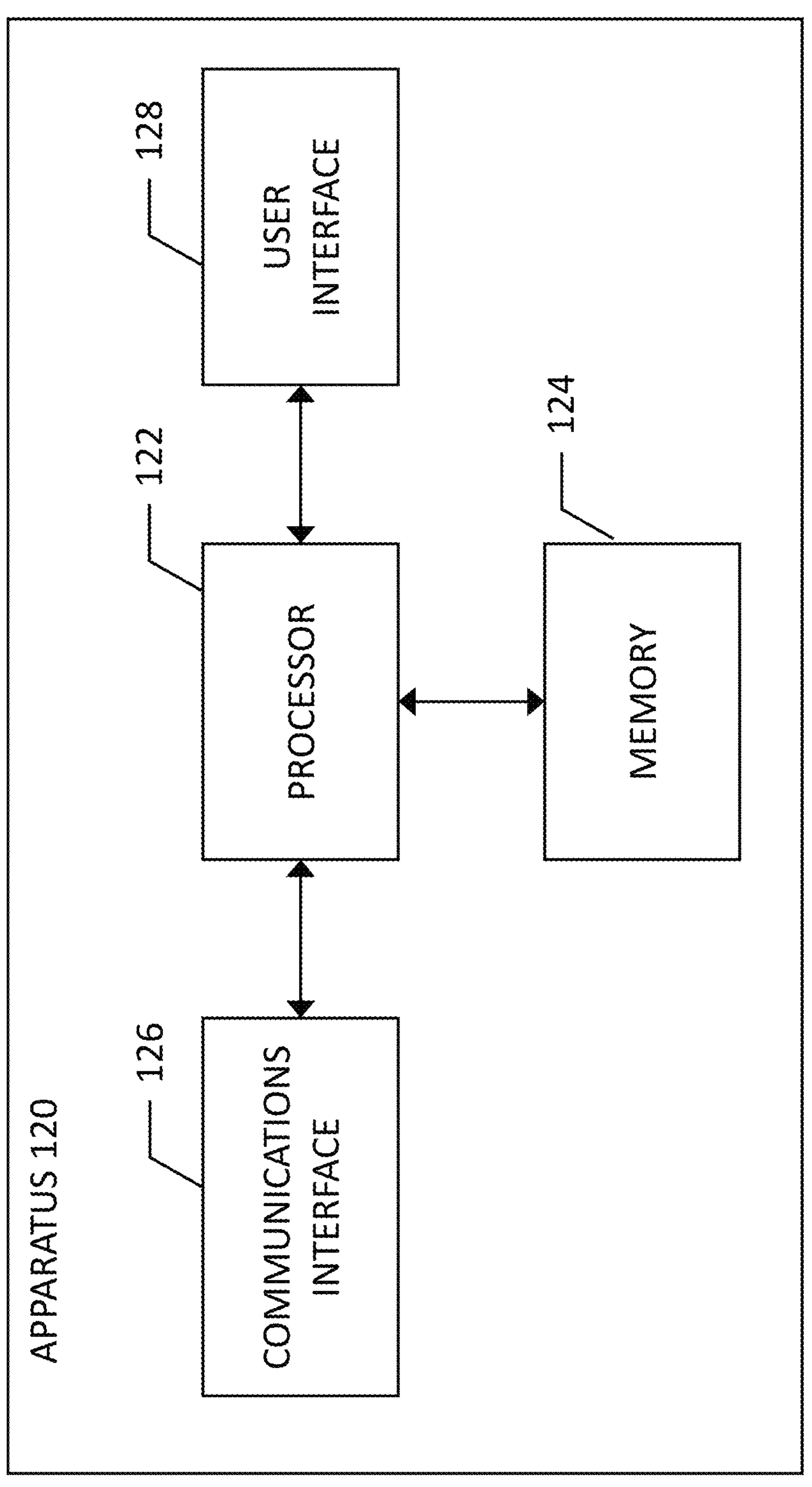
Figure 5:
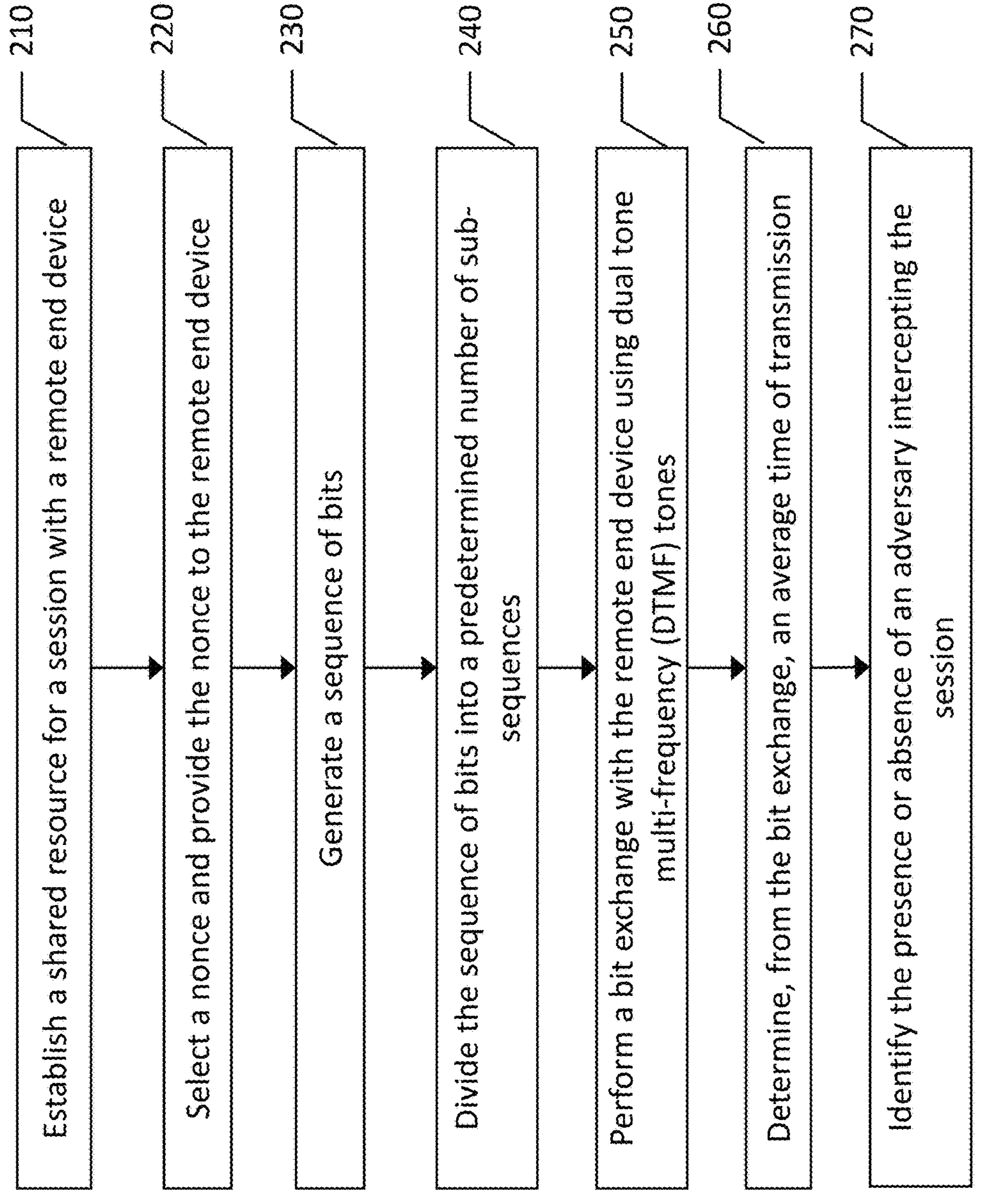

Having thus described certain example embodiments of the present disclosure in general terms, reference will hereinafter be made to the accompanying drawings which are not necessarily drawn to scale, and wherein:

FIG. 1 is a diagram illustrating a traditional call path and a call path intercepted by an adversary according to an example embodiment of the present disclosure;

FIG. 2 is a message flow chart of application of an algorithm on a call to identify an adversarial intercept attempt according to an example embodiment of the present disclosure;

FIG. 3 is a table depicting performance and adversarial success values for the algorithm described herein according to an example embodiment of the present disclosure;

FIG. 4 is a block diagram of an apparatus according to an example embodiment of the present disclosure; and FIG. 5 is a flowchart of a method for identifying call interception from an adversary according to an example embodiment of the present disclosure.

DETAILED DESCRIPTION

Some embodiments of the present disclosure will now be described more fully hereinafter with reference to the accompanying drawings, in which some, but not all, embodiments of the invention are shown. Indeed, various embodiments of the disclosure may be embodied in many different forms and should not be construed as limited to the embodiments set forth herein; rather, these embodiments are provided so that this disclosure will satisfy applicable legal requirements. Like reference numerals refer to like elements throughout. As used herein, the terms "data," "content," "information," and similar terms may be used interchangeably to refer to data capable of being transmitted, received and/or stored in accordance with embodiments of the present invention. Thus, use of any such terms should not be taken to limit the spirit and scope of embodiments of the present disclosure.

Mobile devices including cellular telephones that connect to a network through base stations of a network can be vulnerable to adversarial attacks that attempt to obtain information of value to an adversary, such as through the use of International Mobile Subscriber Identity Catchers (IMSI catchers) and Audio Rogue Base Stations (ARBSs). ARBSs enable an adversary to intercept cellular calls and to track device location. These ARBSs represent a substantial escalation in the threat posed by traditional rogue base stations, which are only capable of collecting device identity information. Embodiments described herein present a system, apparatus, and method for detecting call eavesdropping via an ARBS. Embodiments employ distance bounding over the call audio channel to determine whether or not extra wireless hops (and therefore increased audio delay) that are characteristic of ARBSs are present during a call. Embodiments provide the ability to detect all attacks, with no false positives, due to a statistically significant difference in round trip times between benign and attack call audio due to the large temporal cost of additional wireless hops. Using the methods described herein, these eavesdropping devices can be efficiently and robustly detected.

Embodiments of the present disclosure take advantage of the inherent properties of an ARBS attack, which adds two extra wireless hops to every audio round trip. These two extra wireless hops add measurable delay to calls in the form of retransmission costs. Embodiments employ a distance bounding solution for measuring RTT (Round Trip Time), which will be substantially increased in the presence of ARBS. Presently, no security mechanisms can determine whether a call is being eavesdropped upon in real-time. Creating such a detector is crucial in both unauthorized and authorized wiretapping incidents. Specifically, whereas the former is illegal, a crucial property of the latter is that it must be undetectable.

Embodiments described herein identify a fixed increase in mouth-to-ear delay caused by expensive transcoding costs related to having an additional wireless hop in each direction, as a signal of the presence of such devices. Embodiments of the present disclosure are designed specifically to detect small changes in a call path indicative of interceptions via an ARBS, which other applications of acoustic distance bounding have been unable to achieve. Embodiments can be deployed and bootstrapped in real world applications. Testing confirms the functionality described herein in geographically diverse areas to demonstrate a constituent attack delay of around 360 milliseconds using an ARBS. Embodiments not only provide the ability to detect all attacks, but can distinguish between attacks and benign traffic which are separated by around fifteen standard deviations.

Cellular interceptor devices, which include IMSI catchers and ARBSs have been a longstanding problem in mobile telecommunications. These devices can be defined as malicious hardware capable of communicating on cellular frequencies as legitimate network entities to end devices or cellular networks. Though the ease of operating a cellular interceptor has decreased with the enhanced security practices of modern cellular standards, intercepting devices have adapted and remain effective.

Cellular interceptor devices masquerade as legitimate base stations to establish a connection with end devices. The exact capabilities of these devices can vary based on the network technology and vulnerabilities they exploit. Cellular interceptors can be broken into two fundamental groups: the IMSI catchers and ARBSs. ARBSs convince end devices that they are legitimate cellular base stations and capture all communication along a call path. ARBSs and IMSI catchers both attempt to convince end user devices that they are a legitimate network entity; however, ARBSs possess the ability to store and forward cellular traffic between end devices and legitimate network including call audio, hence the name Audio Rogue Base Station. In order to accomplish this, it is necessary for an ARBS to either complete or avoid the authentication process between an end device and the cellular network it wishes to communicate with.

The impact an ARBS has on cellular network traffic is illustrated in FIG. 1. A traditional call path is shown in the top illustration where an end device 10 connects to a local base station 15 which forwards data through the core cellular network (PSTN) 20 to the base station 25 nearest the intended recipient who receives it on a second end device 30. Conversely, an ARBS attack is illustrated in the lower illustration of FIG. 1, which begins when a target end device 40 connects to an ARBS 45. The ARBS 45 advertises itself as part of the local network and transmits at a high power to entice nearby phones to favor the ARBS 45 over other nearby towers. The ARBS 45 also establishes a connection to a legitimate local base station 50 in the role of an end device pretending to be the target user. The ARBS then forwards all cellular network activity between the target end device 40 and the legitimate network using a local base station 50 which forwards data through the core cellular network PSTN 55 to the base station 60 nearest the intended recipient who receives it on a second end device 65. As a result, end devices can provide the malicious base station with sensitive information including call audio, short message services (SMS) messages, cellular data, and location information.

ARBSs have long been dismissed as a threat due to the cost to construct such a device. However, with advancing technology and the cost of entry decreasing, these devices can become available to adversaries at fractions of the cost just a few years ago. ARBSs are also employed by law enforcement and government entities. Commercial ARBSs (e.g., Stingrays) are sold under special agreements and are not available to the general public. However, information about these devise has surfaced over time and shown that they are capable of operating in modern 3G and 4G networks.

Another group of cellular interceptors, referred to as IMSI catchers, complete their attack prior to authenticating with end devices. IMSI catchers obtain unique and static International Mobile Subscriber Identity (IMSI) values for cellular end devices by exploiting vulnerabilities in the various authentication protocols across all generations of cellular technologies. This has been accomplished via techniques such as forcing end devices to expose their IMSI values prior to authentication or via vulnerabilities in the handover process. While IMSI catchers are an ongoing concern, they are less capable than ARBSs and not as substantial of a threat.

An adversary can intercept a cellular network communication in many different ways, though the fundamental concept of an attack remain the same. Cellular interceptor devices exploit known vulnerabilities in the authentication process between end devices and cellular networks. This idea holds true for all cellular technology generations, and has shown to be problematic regardless of the enhanced security features provided by modern networks.

Achieving the goal of appearing as a legitimate base station to both end devices and networks varies depending on the generation of cellular network technology for which the attack is conducted. In 2G cellular networks, it is a trivial task as only one-way authentication is used allowing any device capable of broadcasting on 2G frequencies to act as a base station. This vulnerability led to the introduction of the AKA protocol in 3G networks to provide mutual authentication between end devices and a serving cellular network. 4G and 5G networks make use of extensions of the 3G AKA protocol, with the main difference being the use of a key hierarchy for improved key management within the network.

The introduction of the AKA protocol with modern cellular networks increased the difficulty of performing an ARBS attack. However, one of the most frequently used strategies to defeat this is to avoid the AKA protocols entirely. In what is commonly referred to as a “Step-Down Attack”, an ARBS can force devices in an area to fall back to 2G networks by jamming the control channel frequencies of newer network protocols. End devices commonly provide backward compatibility with legacy generations in their baseband processors. This allows users to have cellular access when modern cellular services is not available. By forcing connection establishment via 2G, an ARBS can avoid the AKA protocol entirely.

Despite the eventual sunset of 2G networks, ARBSs will remain an issue. An ARBS can gain access to AKA authentication vectors through various methods depending on network technology and prerequisite abilities an adversary might have. An outside attacker comprising the network core has previously been demonstrated in the past, and in some cases has resulted in the installation of malware within the network itself. If an adversary can acquire authentication vectors by these or similar means, they can complete AKA protocols using an ARBS. Moreover, an attack via an ARBS is likely to happen at the nearest tower, which can provide an adversary with all necessary keys. The challenge of obtaining network resources can also be overcome with the help of insider access.

In addition to compromises by malicious attackers, authentication keys may also be obtained by law enforcement and government entities in cooperation with the providers. This has been demonstrated where law enforcement and governmental entities obtain court-issued orders to access cellular data to which cellular providers need to provide access to the protected network resources. With access to authentication vectors being provided by the network, law enforcement and government entities can complete the AKA protocols.

By adding an additional wireless hop to the path a call travels, there will be a measurable and significant increase in the round trip time (RTT) of the call audio. This increase in time is due to multiple components introduced through the addition of an ARBS, which together, result in a significant impact on RTT. Thus, embodiments described herein can detect the presence of a rogue base station using prerequisite knowledge of the expected RTT for an approximate distance.

Similar to traditional IP-based Internet, cellular networks are subject to numerous forms of delay that all contribute to the overall time it takes to send and receive data packets. However, cellular networks actively manipulate packets and their contents (e.g., latency induced by codecs and digital-to-analog conversions). The concept of delay with regard to call audio is referred to as "Mouth-to-Ear Delay", and more specifically, is the delay in call audio between when one party speaks and the other party hears the speech. To convey the fundamental differences in latency between IP-based internet and cellular networks, the ITU G.114 standard guidelines and the associated "E-Model" transmission rating algorithms are used. These guidelines illustrate that a one-way delay of 400 ms (milliseconds) is deemed satisfactory with regard to cellular networks in contrast to traditional IP-based internet where 100 ms would negatively impact a connection.

Embodiments described herein detect the presence of an additional wireless hop indicative of ARBS interception. Embodiments identify the presence of ARBSs after a connection is already established to an end device. Law enforcement and government agencies can, in certain circumstances, legally obtain access to telecommunication resources to perform lawful interception of calls and other data. These traditional wiretaps allow interception from within a core network through CALEA (Commission on Accreditation for Law Enforcement Agencies) interfaces and are generally designed to be undetectable. This approach avoids the addition of the wireless hop and consequently avoids detection by embodiments described herein. However, this approach also requires inside access to telecommunications providers and is not accessible to the general public, such that such techniques are generally of lower concern.

Laws concerning fake base stations are inconsistent, unclear, and location-dependent, such that even lawful interception via the use of ARBSs can be subject to less scrutiny than traditional wiretapping. Embodiments described herein are capable of detecting even lawful interception via the use of ARBSs (e.g., mounted on top of a vehicle with no wired connection to a network).

While currently deployed networks have stronger authentication mechanisms, they remain vulnerable to both downgrade attacks and the use of null ciphers. Further, law enforcement may request access to authentication tokens from the network during "exigent" or "exceptional" circumstances, allowing them to bypass security mechanisms that may be in place. Consequently, all currently deployed networks are vulnerable to a range of adversaries. The adversary can forward all cellular traffic between a target device and a legitimate network. Calls that pass through ARBSs are unencrypted and thus, in addition to storing a copy of all messages, an adversary may also manipulate them. This includes fabricating, modifying, or dropping the audio through the voice channel. Further, noise or additional audio can be injected into the audio channel of a call.

An adversary typically controls the ARBS, but would likely not be able to easily determine a location of the other remote end devices prior to a call. However, in the event of a targeted attack on a specific call, an adversary could have acquired a remote end device's approximate location information. This can be done through technical means, such as phishing, or simply estimating a location based on prerequisite knowledge (e.g. home location, work location, frequently visited location, etc.). Consequently, it may be assumed that an adversary knows the expected latency for every call to account for targeted attacks.

Embodiments described herein construct a distance bounding-inspired protocol that reflects the adversarial model. Distance bounding protocols allow parties to determine a tight upper bound on a distance between the parties by observing the travel time of messages. At a high level, a prover and verifier rapidly exchange bits as challenges and responses while measuring the RTT of those messages. Many distance bounding protocols offer various performance and security guarantees. Typically, these protocols are designed with the intent of being used for applications where a prover and a verifier are at a line-of-sight distance from one another, and in some cases, as close as touching. Often, the messaging latency in these protocols is defined by physical constraints, such as the time needed for a wireless signal to propagate over a relatively short distance, allowing traditional distance bounding algorithms to provide centimeter-level accuracy.

Unlike traditional distance bounding, the attack scenarios described herein are on a much larger scale with a higher degree of variability in the messaging path, due to the multi-hop nature of this setting. The approach described herein is analogous to a secure version of ping designed for cellular networks. In a cellular network call, the number of hops between end devices is variable depending upon the network conditions. The network path information is not made available to end devices and there are no tools to obtain it. The protocol described herein accounts for this variability while also providing an upper bound on RTT such that attacks are more accurately identified.

Embodiments of the present disclosure prioritize the ability to be resistant to impersonation fraud and mafia fraud over distance fraud and terrorist fraud since they do not apply to the threat model employed. Taking this into consideration, embodiments are informed by well-known distance bounding protocols to use as a foundation. The protocol described herein aims to minimize bits exchanged, be resilient to impersonation and mafia fraud, and to minimize computation. Because the RTT values of example embodiments are much larger than those assumed by traditional distance bounding, the number of bits exchanged during the protocol greatly impacts the overall time for completion. As such, it is important to minimize the bits exchanged. Impersonation and mafia fraud attacks are possible under the threat model considered herein such that embodiments prioritize protocols that are more effective against these attacks. The protocol of example embodiments is lightweight (requires low processing capacity) and can be run on an array of hardware. Many distance bounding protocols use techniques to improve security at a performance cost. This is largely due to a second slow phase after the challenge and response phase, which adds additional post processing after exchanging data.

FIG. 2 is a message flow diagram of a protocol of example embodiments for two participating end devices. These devices are referred to herein as a prover P and a verifier V. The entities can be associated respectively with the target end device and the remote end device referred to throughout. The protocol of example embodiments functions via the audio channel of calls and allows the prover to have more control of the protocol results.

The algorithm of example embodiments includes three phases as depicted in FIG. 2. The first phase of the protocol requires prover P and verifier V to establish a shared resource-secret K at the start of a session (e.g., an audio call). The method by which this happens can vary; however, TLS (Transport Layer Security) is typically used if available. If no IP-based communication is possible, an alternative option is to employ a system of secure key establishment via the audio channel of a call. As the algorithm described herein is implemented over the audio channel, data is exchanged in-band. To achieve this, DTMF (dual-tone multi-frequency) tones are employed, which are standard in-band signals that operate as base-16 values. Note that in FIG. 2, all messages that are exchanged between verifier V and prover P after key and nonce establishment are DTMF messages.

Once both prover P and verifier V have secret K, they each select a nonce (Np and Nv, respectively) and exchange them via the same channel used to establish K. Once Np and Nv have been exchanged, prover P and verifier V generate a sequence of bits H of length (2+m)n, where n is the number o challenges to be sent using a pseudorandom function (a MAC or hash algorithm) given K, Np, and Nv as inputs. The value of m is the number of individual challenges, and can be selected depending upon implementation; however, embodiments described herein use a value of four. H is divided into six separate sub-sequences of length n each: pre-defined m-ary challenges D, random binary values T, and four binary sequences v0, v1, v2, and v3, as shown below:

$$m = 4$$

$$H = h(K, N_a, N_b)$$

$$T = H_1 \| H_2 \| \ldots \| H_n$$

$$v^0 = H_{n+1} \| H_{n+2} \| \ldots \| H_{2n}$$

$$v^1 = H_{2n+1} \| H_{2n+2} \| \ldots \| H_{3n}$$

$$v^2 = H_{3n+1} \| H_{3n+2} \| \ldots \| H_{4n}$$

$$v^3 = H_{4n+1} \| H_{4n+2} \| \ldots \| H_{5n}$$

$$D = H_{(m+2)n+1} \ldots H_{(m+2)n+d} \| \ldots \| H_{(m+2)n+(n-1)d+1} \ldots H_{(m+2)n+nd}$$

Once these sequences are generated, the first stage of the protocol is complete.

The algorithm Phase 2 employing Fast Bit Exchange from 1 to n has the verifier V perform the following before starting the Start Clock and sending the DTMFc to the prover P:

$$C_i = \begin{cases} \text{Pick } S_i \in \{0, m-1\} \\ S_i, \ \text{if } T_i = 1 \\ D_i, \ \text{if } T_i = 0 \end{cases}$$

The prover P then decodes DTMFc to obtain $DTMF_R$ using the following:
If $T_i=1$, then $$R_i = v_i^j, \text{ if } C_i = D_i$$

If $T_i=0$, then $$R_i = \begin{cases} v_i^0, & \text{if } C_i = D_i \\ \text{random}, & \text{if } C_i \neq D_i \end{cases}$$

Then $DTMF_R$ is returned to the verifier V and the time clock is stopped. The time t, is obtained from the time it took to send and return the tones. Phase 3 of reconciliation is performed to decode $DTMF_R$.

In addition to selection of the m value, there are other design considerations to consider for real-world deployment. The n value is the number of challenges and responses used in the fast bit exchange phase. The number of challenges and responses is a trade-off between performance and security. The value of n can be adjusted to meet the security and performance needs of a deployed system.

For an adversary attempting impersonation fraud against the above-described protocol, they would need to correctly guess all challenges. This yields a success probability of (1/4) n when m=4. If an adversary instead attempts mafia fraud, the success probability is subject to the balance of bit values in the random sequence T calculated during the second phase of the protocol. As a result, the probability ranges between the best-case scenario of (7/16) n and a worst-case scenario of (3/4) n.

The completion time of the algorithm is modeled with respect to the number of rounds with the equation:

$$t_c = 2n(t_{nd} + t_{dtmf} + t_p)$$

Where $t_{nd}$ is the one-way network delay, $t_{dtmf}$ is standard DTMF length of 90 ms, and ty is the standard pause time following a DTMF tone of 65 ms. An increase in the value of n can degrade performance such that a balance is sought between performance and threat protection. One-way network time can vary, especially in the case of an ARBS attack, for performance analysis a worst-case scenario is presumed of a 550 ms one-way network delay. The table of FIG. 3 illustrates performance and adversarial success values for varying n as described herein with a value of four for m.

Verification of the ability to detect a threat is performed using measurements of mouth-to-ear delay of legitimate calls in various scenarios relative to an active attack. Three components are employed to verify the detection including a target end device (e.g., the prover), the remote end device (e.g., the verifier), and the ARBS. Standards and studies on the mount-to-ear delay indicate that call latency is primarily introduced by wireless uplinks and downlinks, which is doubled when connected to an ARBS. These standards anticipate approximately 190 ms of delay for both an uplink and downlink in one direction, and is doubled when considering RTT. As such, approximately 380 ms of additional round trip delay is to be expected.

On average, a sampling of legitimate calls, not subject to attack, had a RTT of 507 ms, while the average for calls under attack (connected over an ARBS) was 885 ms. Using a standard two-sided t-test of this sample yields t=50 and p<<0.01, providing strong support that calls under attack through connection via an ARBS can be distinguished from legitimate calls using the algorithm described herein. This distinction, while primarily based on 2G and 3G networks, is also found in LTE networks. LTE RTT is generally indistinguishable from 2G and 3G RTT. Thus, embodiments of the algorithm described herein can provide an indication of whether an adversary has intercepted a session or audio call based on the average time of transmission of the RTT. A session having an average transmission time value above a certain first predetermined value (e.g., 700 ms) may be identified as intercepted by an adversary, while a session having an average transmission time below a second predetermined value (e.g., 500 ms) may be identified as not being intercepted by an adversary. The first predetermined value may be the same as the second predetermined value. However, when there is a delta between the first predetermined value and the second predetermined value, a session having an average transmission time that falls between the two values may be identified as suspect. For example, if the average transmission time is greater than 90% of the difference between the second predetermined value and the first predetermined value (e.g., 680 ms in the example above), the session may be identified as 90% likely to have been intercepted.

A user of the target end user device and/or the remote end user device may be provided with an indication of the presence, absence, or likelihood of an adversary intercepting the session. This may be in the form of an audible warning or an indication on a display of the end user device, for example. A user may then take the action they deem appropriate responsive to the likelihood of a session being compromised.

Audio rogue base stations allow adversaries to eavesdrop on calls. However, the additional wireless hops that incur delays from encryption, transcoding and retransmission create measurable differences in the delay experienced by surveilled calls. Embodiments described herein employ a protocol as a means of detecting this delay. Embodiments use a secure distance bounding algorithm that is tailored for use in the voice channel. Whether an adversary exploits 2G connectivity, downgrade attacks or the compromise of network credentials, embodiments described herein demonstrate that such attacks can be robustly detected.

FIG. 4 is a schematic diagram of an example of an apparatus 120 that may be embody a mobile device such as a target end device or remote end device as described herein. The apparatus 120 may include or otherwise be in communication with a processor 122, a memory 124, a communication interface 126 and a user interface 128. As such, in some embodiments, although devices or elements are shown as being in communication with each other, hereinafter such devices or elements should be considered to be capable of being embodied within the same device or element and thus, devices or elements shown in communication should be understood to alternatively be portions of the same device or element.

In some embodiments, the processor 122 (and/or co-processors or any other processing circuitry assisting or otherwise associated with the processor) may be in communication with the memory 124 via a bus for passing information among components of the apparatus. The memory 124 may include, for example, one or more volatile and/or non-volatile memories. In other words, for example, the memory 124 may be an electronic storage device (e.g., a computer readable storage medium) comprising gates configured to store data (e.g., bits) that may be retrievable by a machine (e.g., a computing device like the processor). The memory 124 may be configured to store information, data, content, applications, instructions, or the like for enabling the perform the algorithm(s) described above to detect an attack via an ARBS. For example, the memory 124 could be configured to buffer input data for processing by the processor 122, such as measuring RTT and analyzing, generating, or decoding DTMFs.

The processor 122 may be embodied in a number of different ways. For example, the processor 122 may be embodied as one or more of various hardware processing means such as a coprocessor, a microprocessor, a controller, a digital signal processor (DSP), a processing element with or without an accompanying DSP, or various other processing circuitry including integrated circuits such as, for example, an ASIC (application specific integrated circuit), an FPGA (field programmable gate array), a microcontroller unit (MCU), a hardware accelerator, a special-purpose computer chip, or the like. As such, in some embodiments, the processor may include one or more processing cores configured to perform independently. A multi-core processor may enable multiprocessing within a single physical package. Additionally or alternatively, the processor 122 may include one or more processors configured in tandem via the bus to enable independent execution of instructions, pipelining and/or multithreading. The processor may be embodied as a microcontroller having custom bootloader protection for the firmware from malicious modification in addition to allowing for potential firmware updates.

In an example embodiment, the processor 122 may be configured to execute instructions stored in the memory 124 or otherwise accessible to the processor 122. Alternatively or additionally, the processor 122 may be configured to execute hard coded functionality. As such, whether configured by hardware or software methods, or by a combination thereof, the processor 122 may represent an entity (e.g., physically embodied in circuitry) capable of performing operations according to an embodiment of the present disclosure while configured accordingly. Thus, for example, when the processor 122 is embodied as an ASIC, FPGA or the like, the processor 122 may be specifically configured hardware for conducting the operations described herein. Alternatively, as another example, when the processor 122 is embodied as an executor of software instructions, the instructions may specifically configure the processor 122 to perform the algorithms and/or operations described herein when the instructions are executed. The processor 122 may include, among other things, a clock, an arithmetic logic unit (ALU) and logic gates configured to support operation of the processor 122. In one embodiment, the processor 122 may also include user interface circuitry configured to control at least some functions of one or more elements of the user interface 128.

The communication interface 126 may include various components, such as a device or circuitry embodied in either hardware or a combination of hardware and software that is configured to receive and/or transmit data, such as audio data for an audio call. The communication interface 126 may include, for example, an antenna (or multiple antennas) and supporting hardware and/or software for enabling communications wirelessly. Additionally or alternatively, the communication interface 126 may include the circuitry for interacting with the antenna(s) to cause transmission of signals via the antenna(s) or to handle receipt of signals received via the antenna(s). For example, the communication interface 126 may be configured to communicate wirelessly such as via Wi-Fi (e.g., vehicular Wi-Fi standard 802.11p), Bluetooth, mobile communications standards (e.g., 3G, 4G, or 5G) or other wireless communications techniques.

The user interface 128 may be in communication with the processor 122, such as the user interface circuitry, to receive an indication of a user input and/or to provide an audible, visual, mechanical, or other output to a user. As such, the user interface 128 may include, for example, one or more buttons, light-emitting diodes (LEDs), a display, a speaker, and/or other input/output mechanisms. The user interface 128 may also be in communication with the memory 124 and/or the communication interface 126, such as via a bus.

The user interface 128 may provide an indication to a user regarding whether a call is deemed safe, or if the call is deemed to be under attack through connection to an ARBS.

FIG. 5 illustrates a flowchart depicting a method according to an example embodiment of the present disclosure. It will be understood that each block of the flowchart and combination of blocks in the flowchart may be implemented by various means, such as hardware, firmware, processor, circuitry, and/or other communication devices associated with execution of software including one or more computer program instructions. For example, one or more of the procedures described above may be embodied by computer program instructions. In this regard, the computer program instructions which embody the procedures described above may be stored by a memory device 126 of an apparatus employing an embodiment of the present invention and executed by a processor 122 of the apparatus 120. As will be appreciated, any such computer program instructions may be loaded onto a computer or other programmable apparatus (for example, hardware) to produce a machine, such that the resulting computer or other programmable apparatus implements the functions specified in the flowchart blocks. These computer program instructions may also be stored in a computer-readable memory that may direct a computer or other programmable apparatus to function in a particular manner, such that the instructions stored in the computer-readable memory produce an article of manufacture the execution of which implements the function specified in the flowchart blocks. The computer program instructions may also be loaded onto a computer or other programmable apparatus to cause a series of operations to be performed on the computer or other programmable apparatus to produce a computer-implemented process such that the instructions which execute on the computer or other programmable apparatus provide operations for implementing the functions specified in the flowchart blocks.

Accordingly, blocks of the flowchart support combinations of means for performing the specified functions and combinations of operations for performing the specified functions for performing the specified functions. It will also be understood that one or more blocks of the flowchart, and combinations of blocks in the flowchart, can be implemented by special purpose hardware-based computer systems which perform the specified functions, or combinations of special purpose hardware and computer instructions.

FIG. 5 is a flowchart of a method for identifying an audio rogue base station intercept of a call using a modified distance bounding algorithm. As illustrated, a shared resource for a session (e.g., an audio call) with a remote end device is established at 210. This may be established, for example, using TLS. A nonce is selected at 220 and provided to the remote end deice. A sequence of bits is generated at 230, and divided into a predetermined number of sub-sequences at 240. A bit exchange is performed with the remote end device using dual tone multi-frequency (DTMF) tones at 250. Based on the bit exchange, an average time of transmission is determined at 260. This may be the RTT of the bit exchanges, for example. At 270, the presence or absence of an adversary intercepting the session is identified. This may be performed, for example, using the average time of transmission of the bits.

In an example embodiment, an apparatus for performing the method of FIG. 5 above may comprise a processor (e.g., the processor 122) configured to perform some or each of the operations (210-270) described above. The processor may, for example, be configured to perform the operations (210-270) by performing hardware implemented logical functions, executing stored instructions, or executing algorithms for performing each of the operations. Alternatively, the apparatus may comprise means for performing each of the operations described above. In this regard, according to an example embodiment, examples of means for performing operations 210-270 may comprise, for example, the processor 24 and/or a device or circuit for executing instructions or executing an algorithm for processing information as described above.

Many modifications and other embodiments of the inventions set forth herein will come to mind to one skilled in the art to which these inventions pertain having the benefit of the trainings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

That which is claimed:

1. An apparatus comprising at least one processor and at least one non-transitory memory including computer program code instructions, the computer program code instructions configured to, when executed, cause the apparatus to at least:

establish a shared resource for a session with a remote end device;

select a nonce and provide the nonce to the remote end device to establish a shared secret with the remote end device;

generate a sequence of bits;

divide the sequence of bits into a predetermined number of sub-sequences;

perform a bit exchange with the remote end device using dual tone multi-frequency (DTMF) tones to send each sub-sequence of the predetermined number of sub-sequences to the remote end device;

receive a DTMF response and determine a transmission time;

decode and reconcile the DTMF response;

determine, from the bit exchange, an average time of transmission; and identify a presence of an adversary intercepting the session in response to the average time of transmission exceeding a predetermined time.

2. The apparatus of claim 1, wherein causing the apparatus to perform a bit exchange with the remote end device using DTMF further comprises causing the apparatus to determine a time of transmission for each bit exchange with the remote end device.

3. The apparatus of claim 2, wherein the average time of transmission comprises an average of the time of transmission for each bit exchange with the remote end device.

4. The apparatus of claim 1, wherein causing the apparatus to identify the presence or absence of an adversary intercepting the session comprises causing the apparatus to determine the presence of an adversary intercepting the session in response to the average time of transmission being above a first predetermined value.

5. The apparatus of claim 4, wherein causing the apparatus to identify the presence or absence of an adversary intercepting the session comprises causing the apparatus to determine the absence of an adversary intercepting the session in response to the average time of transmission being below a second predetermined value.

6. The apparatus of claim 1, wherein the sequence of bits is based on a number of challenges to the remote end device and a number of bits in each of the challenges to the remote end device.

7. The apparatus of claim 1, wherein causing the apparatus to establish the shared resource comprises causing the apparatus to generate the shared resource using transport layer security (TLS).

8. A computer program product comprising at least one non-transitory computer-readable storage medium having computer-executable program code instructions stored therein, the computer-executable program code instructions comprising program code instructions to:

establish a shared resource for a session with a remote end device;

select a nonce and provide the nonce to the remote end device to establish a shared secret with the remote end device;

generate a sequence of bits;

divide the sequence of bits into a predetermined number of sub-sequences;

perform a bit exchange with the remote end device using dual tone multi-frequency (DTMF) tones to send each sub-sequence of the predetermined number of sub-sequences to the remote end device;

receive a DTMF response and determine a transmission time;

decode and reconcile the DTMF response;

determine, from the bit exchange, an average time of transmission; and identify a presence of an adversary intercepting the session in response to the average time of transmission exceeding a predetermined time.

9. The computer program product of claim 8, wherein the program code instructions to perform a bit exchange with the remote end device using DTMF further comprise program code instructions to determine a time of transmission for each bit exchange with the remote end device.

10. The computer program product of claim 9, wherein the average time of transmission comprises an average of the time of transmission for each bit exchange with the remote end device.

11. The computer program product of claim 8, wherein the program code instructions to identify the presence or absence of an adversary intercepting the session comprise program code instructions to determine the presence of an adversary intercepting the session in response to the average time of transmission being above a first predetermined value.

12. The computer program product of claim 11, wherein the program code instructions to identify the presence or absence of an adversary intercepting the session comprise program code instructions to determine the absence of an adversary intercepting the session in response to the average time of transmission being below a second predetermined value.

13. The computer program product of claim 8, wherein the sequence of bits is based, at least in part, on a number of challenges to the remote end device and a number of bits in each of the challenges to the remote end device.

14. The computer program product of claim 8, wherein the program code instructions to establish the shared resource comprise program code instructions to generate the shared resource using transport layer security (TLS).

15. A method comprising:

establishing a shared resource for a session with a remote end device;

selecting a nonce and provide the nonce to the remote end device to establish a shared secret with the remote end device;

generating a sequence of bits;

dividing the sequence of bits into a predetermined number of sub-sequences;

performing a bit exchange with the remote end device using dual tone multi-frequency (DTMF) tones to send each sub-sequence of the predetermined number of sub-sequences to the remote end device;

receiving a DTMF response and determine a transmission time;

decoding and reconcile the DTMF response;

determining, from the bit exchange, an average time of transmission; and identifying a presence of an adversary intercepting the session in response to the average time of transmission exceeding a predetermined time.

16. The method of claim 15, wherein performing a bit exchange with the remote end device using DTMF further comprises determining a time of transmission for each bit exchange with the remote end device.

17. The method of claim 16, wherein the average time of transmission comprises an average of the time of transmission for each bit exchange with the remote end device.

18. The method of claim 15, wherein identifying the presence or absence of an adversary intercepting the session comprises determining the presence of an adversary intercepting the session in response to the average time of transmission being above a first predetermined value.

19. The method of claim 18, wherein identifying the presence or absence of an adversary intercepting the session comprises determining the absence of an adversary intercepting the session in response to the average time of transmission being below a second predetermined value.

20. The method of claim 15, wherein the sequence of bits is based, at least in part, on a number of challenges to the remote end device and a number of bits in each of the challenges to the remote end device.

* * * * *